United States Patent [19]

Geyer

[11] Patent Number: 5,316,225
[45] Date of Patent: May 31, 1994

[54] SHREDDING STRAINING APPARATUS

[76] Inventor: Paul Geyer, 210 B. N. Lindell Rd., Greensboro, N.C. 27403

[21] Appl. No.: 21,312

[22] Filed: Feb. 23, 1993

[51] Int. Cl.⁵ .............................................. B02C 23/10
[52] U.S. Cl. ...................................... 241/74; 209/666; 241/82.3; 241/DIG. 31
[58] Field of Search ..................... 241/23, 24, 74, 82.3, 241/82.4, DIG. 31, DIG. 38; 209/660, 666

[56] References Cited

U.S. PATENT DOCUMENTS

| | | | |
|---|---|---|---|
| 4,025,001 | 5/1977 | Yarem et al. | 241/74 X |
| 4,607,796 | 8/1986 | Enikolopov et al. | 241/DIG. 31 |
| 4,685,626 | 8/1987 | Kerdiles et al. | 241/74 |

Primary Examiner—Douglas D. Watts
Attorney, Agent, or Firm—Dykema Gossett

[57] ABSTRACT

The apparatus is for shredding and straining thermo plastic and rubber like materials to produce clear polymer pellets separated from oversize foreign materials, more particularly an apparatus provided with a hopper and forcing section adapted to feed hot or cold selected process materials into a shredding or granulating section which is adapted to granulate vulcanized rubber to pellets so small that they cannot harbor oversize materials or contaminates. The granulating section feeds warmed and under high pressure process material to the straining section which features multiple circumferential openings, adjustable in width in 0.0005 inch graduations, which lead off the fine and fluent phase materials and redirect the oversize and less fluent material to a separate discharge port. To avoid plugging the entrances to the circumferential openings of the straining section are composed of multiple plates, one set of which is stationary and secured to the barrel member. The second set of plates, each plate between plates of the first set, is movable in an orbital pattern so that the entrance to the circumferential opening is in continual motion in relation to each other so as to dislodge accumulated over size material at the circumferential openings. The dislodged material is directed downstream to a special high back pressure over flow device.

3 Claims, 2 Drawing Sheets

SHREDDING STRAINING APPARATUS

FIELD OF THE INVENTION

This invention relates to an apparatus of the rotor and barrel type for shredding or granulating and straining vulcanized rubber like or polymer like materials.

BACKGROUND OF THE INVENTION

The rubber and plastic industries use screen type straining devices with restrictive holes to separate over size material from the process material. The restrictive holes progressively become plugged, causing an increase in the extrusion pressure, required to process the material. The progressive change in pressure requires additional input work per unit of material and thereby generates uneven temperature. The plastic industry has advanced to the extent that continuous screen changing devices are used to improve uniformity. The reclaim of vulcanized rubber products has been and is accomplished by warming the material and passing it through a rugged refiner mill which is set to an extremely small nip.

SUMMARY OF THE INVENTION

It is therefore a feature of the present invention to provide an improved apparatus which "cuts" the process material as it passes member to member.

Another feature of the present invention is to provide an improved apparatus with barrel extrusion sections which can be adapted for the introduction of liquid chemical additives.

Still another feature of the present invention is to provide co-acting longitudinal edges, both rotor and barrel, arranged to cut the process material and direct the cut material downstream for further processing.

A further feature of the present invention is to provide multiple member to member transfers arranged to progressively cut the material into finer and finer pieces to assist in removal of wire as used in the construction of tires.

A still further feature of the present invention is to provide straining geometry adequate to stop the flow of construction wire as small as 0.009 inches in diameter, as used in radial ply tire constructions.

Another feature of the present invention is to provide circular plates, separated by shim stock which measures the circumferential opening at the barrel bore to provide adjustment as to the width of the opening. Shim stock is available to establish the opening width of 0.0015 plus in units of 0.0005 inches.

Still another feature of the present invention is to provide cooling for the material lead of by the circumferential openings.

A further feature of the present invention is to provide continuous circular orbital motion of one set of plates in relation to the other set in a manner which moves oversize material accumulating at the opening entrance and directs it downstream.

DESCRIPTION OF THE PREFERRED EMBODIMENT

In the present invention a means is provided to continuously supply the shredding and straining sections of the apparatus with process material under pressure.

The shredding section of the apparatus of the present invention is comprised of rotor and barrel members, each of which are provided with a succession of cutting edges arranged in a row to form a helical pattern around each member, and which co-act with each other to cut and to then transfer the process material member to member.

The shredding section consists of four transfer zones; the first zone, rotor to barrel, has a rotor with a single row of knives transferring the process material to a co-acting barrel member provided with two rows of knives; the second zone, barrel to rotor has the barrel member provided with two rows of knives transferring the process material to the co-acting rotor member provided with four rows of knives; the third zone, rotor to barrel has the rotor member provided with four rows of knives transferring the process material to the co-acting barrel member provided with six rows of knives; and the forth zone, barrel to rotor has the barrel member provided with six rows of knives transferring the process material to the co-acting rotor member provided with eight rows of knives.

The transfers member to member provide an imposed order of cutting a unit of process material into two hundred pieces. The multiple knife arrangement can increase the cutting action at least ten fold. The net result is that the process material is granulated and warmed as it passes from the shredding section to the straining section of the apparatus.

Figure 1:
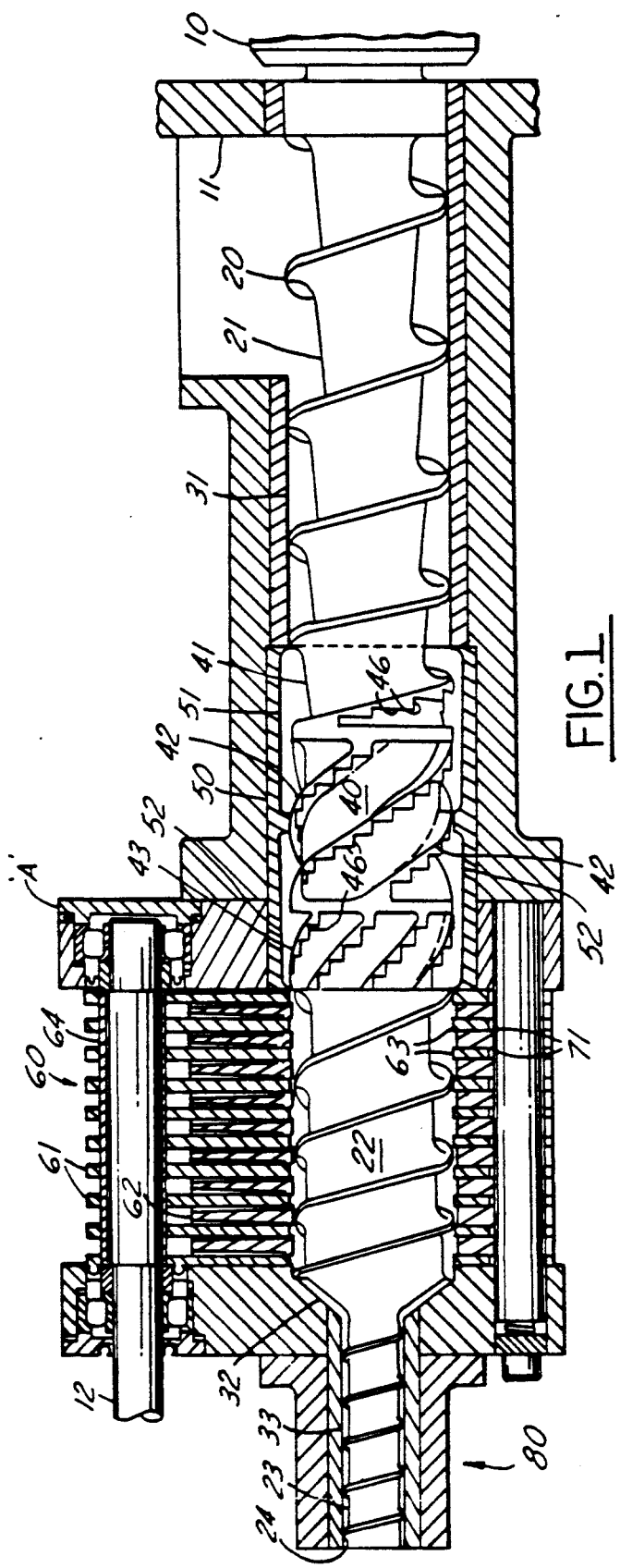
FIG. 1 is a longitudinal elevational view of the shredding straining apparatus, partly in section, constructed in accordance with the present invention and which represents the preferred embodiment.

Referring now to the drawings, the apparatus is designated by the letter "A". The apparatus "A" in accordance with the invention is applied to the continuous shredding or granulating and straining of hot or cold-fed polymers particularly rubber material from scrap tires, and has all of the advantages as noted in the introduction. The apparatus "A" as shown in FIG. 1, has a hopper 11 with an entrance opening and a forcing section including a rotor 20 rotated by the drive means 10 to pressurize the process material as required by the rotor shredding and straining sections 40 and 50. The apparatus "A" also can be applied to an existing extruder to supply the process material at the pressure required by the shredding and straining sections of the apparatus "A". The rotor 20 has a helical groove 21 at the leading end thereof and the helical rotor grooves 22 in the straining section 60.

Figure 13:
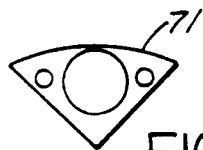
FIG. 13 is a plan view of a shim which establishes the space between plates.
Figure 12:
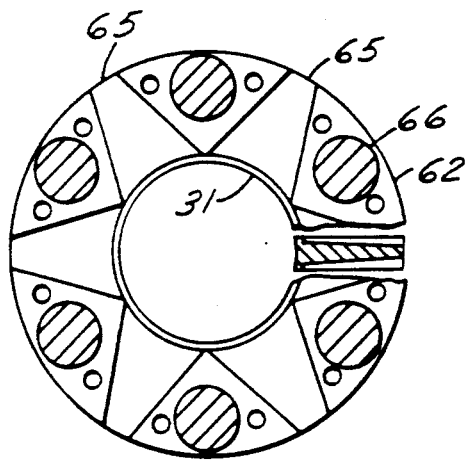
FIG. 12 is an elevational view of the stationary plate of the straining section of the apparatus.
Figure 15:
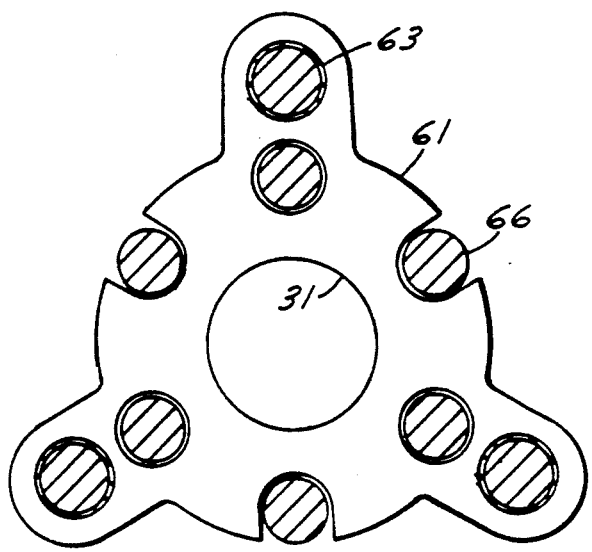
FIG. 15 is an elevational view of the movable plates of the straining section of the apparatus.

The straining section 60 of apparatus "A", FIG. 1 is provided with an elongated barrel, in which rotor 20 having the helical groove 22 is adapted for rotation. The straining section barrel 60 is composed of stationary plates 62 and orbital moving plates 61 separated by shims 71 (FIG. 13), to generate circumferential barrel openings 63, the width of which is controlled by the thickness of the shims 71. The orbital moving plates 61 are moved by the orbital cam shaft 64 and drive means 12 (FIG. 1). The movement as provided between the plates realigns the circumferential openings 63 to dislodge oversize material accumulated at the openings.

The oversize material not led off by the straining section 60 is transported by the transition zone 32 to the discharge extruder 80. This is a low capacity extruder which generates the high back pressure necessary to operate the straining section 60. The discharge extruder 80 consists of rotor 23 operating in barrel bore 31 of the end discharge barrel 33 and discharge end 24.

Figure 4:
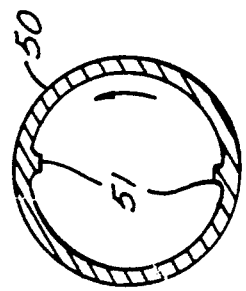
FIGS. 3 and 4 are cross-sectional views taken on the lines 3—3 and 4—4 respectively of FIG. 2 and showing the number of starts of the knife rows provided on the rotor member.
Figure 3:
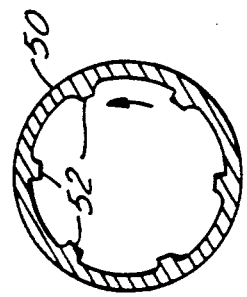
Figure 2:
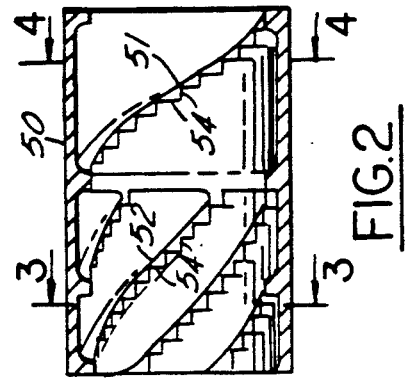
FIG. 2 is a sectional view of the barrel member of the shredding section of the apparatus.
Figure 5:
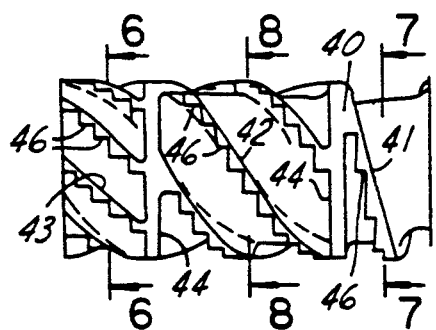
FIG. 5 is an elevational view of the co-acting rotor member for the barrel member of FIG. 2.
Figure 6:
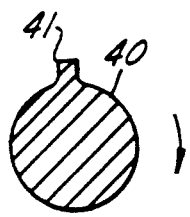
FIGS. 6, 7 and 8 are cross-sectional views taken on the lines 6—6, 7—7, and 8—8 respectively of FIG. 5 and showing the number of starts of the knife rows.
Figure 7:
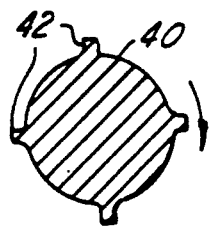
Figure 8:
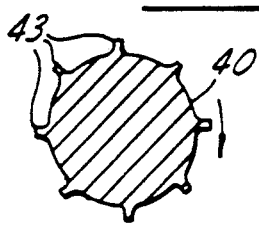

FIG. 2 is a cross-sectional view of the barrel member 50 of the straining section. The rows of knives 51 and 52 with cutting edges 54 perform a triple operation. They serve, as an anvil to cut the process material, to receive the process material from the rotor 20 and to transport cut material down-stream. The number of rows of knives is two for FIG. 4 and six for FIG. 3. The knife edges are shown as 54 and co-act with rotor section 40 which is shown in FIG. 5. In FIG. 5 the rows of knives 41, 42 and 43 cut the process material, transfer it to the co-acting barrel member 50 to be transported down-stream circumferential barrels 4 are provided. The number of rotor knives is one, four and eight, as shown in FIGS. 6, 7 and 8. Thus, in conjunction with the co-acting barrel the number of rows of knives at member to member transfer are; one to two; two to four; four to six and six to eight.

Figure 9:
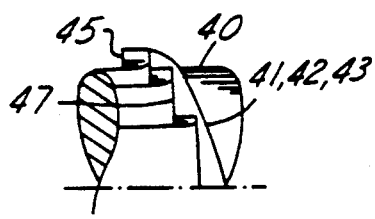
FIG. 9 is a view of a typical rotor cutting edge.

FIG. 9 illustrates details of the rotor knives including the radial edge rotor knives 45, cutting edge rotor knives 46 and the circumferential edge rotor knives 47.

Figure 10:
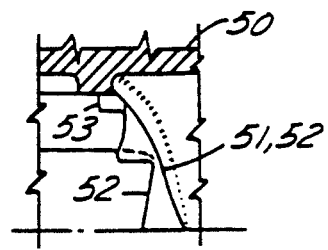
FIG. 10 is a view of a typical barrel cutting edge.
Figure 11:
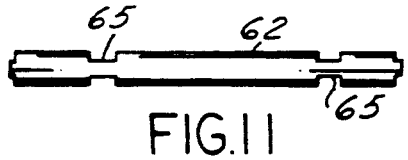
FIG. 11 is a plan view of the stationary plate of the straining section of the apparatus.
Figure 14:
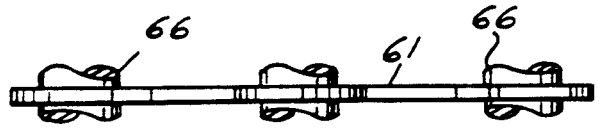
FIG. 14 is a plan view of the movable plates of the straining section of the apparatus.

FIG. 10 illustrates details of the barrel cutting action including the single start barrel knife row 51, the six start barrel knife row 52, radial knife edge barrel knives 53 and the cutting edge barrel knives 54.

Alternate cutting arrangements of the cutting knives FIGS. 9 and 10 can be accomplished by altering the directions of the longitudinal, circumferential and radial surfaces plus or minus of the directions as shown. Since different materials will be processed, different designs may be required for various materials.

The primary function of the straining section 60 is to separate the fine and fluent process material from the oversize and less fluent material. As construction wire of radial ply tires for reclaiming is 0.009 inches in diameter the straining section openings have to be even less. The straining section 60 of the apparatus "A" of this invention is composed of the rotor 20 rotating in a barrel bore 31 formed by multiple alternating plates 61 and 62 and separated from each other by shims 71. The construction is such that a circumferential opening is provided between the plates the width of which is measured by the thickness of the shims 71. As the restrictive circumferential openings will accumulate oversize material at the barrel bore 31 two sets of plates are provided. One set of plates 62 is attached to the barrel structure, while the other set 61, alternating between plates 62, are rotated in an orbital pattern via drive means 10 and cam shafts 64. Thus the two sides of the circumferential openings are continuously moving in relation to each other, and tending to dislodge oversize material accumulated at the entrance to the openings. By changing shims 71 the circumferential openings can be changed in width in increments of 0.0005 inch.

The end discharge section of apparatus "A" (FIG. 1) follows the straining section 60. As the straining section requires high pressure to operate, the design is a low capacity extruder capable of developing the back pressure required, while extruding the designed amount of overflow material. The end discharge extruder 80 consists of a diameter reduction stage, a reduced diameter rotor 23 operating in a barrel bore 33 with an end discharge 24. The rotor 23 as shown is arranged to be easily interchanged to establish rates of flow consistent with the material being processed.

I claim:

1. An apparatus for separating oversize material from various polymer like materials which are processed to provide feed material comprising:
   (a) means for continuously supplying feed material which is warmed and under pressure to a downstream straining section; and
   (b) said straining section comprising a rotor and a surrounding barrel provided with a bore, which is formed by a series of plates, one set of plates which is ridgedly attached, the other set of plates, sandwiched between said one set of plates is movable in an orbital pattern; said plates being separated from each other by shim material which measures the openings between the plates at the barrel bore to provide circumferential barrel openings to lead off the fine and fluent material from the rotor to radial barrel passages; with the oversize material, being dislodged from the opening entrances, and conveyed downstream by the rotor member to a back pressure developing outlet means.

2. An apparatus for the continuous granulating and separating of oversize material from various polymer like materials which are processed to provide feed material comprising:
   (a) means for continuously supplying feed material which is warmed and under pressure to a downstream granulating sections;
   (b) said granulating section comprising rotor and barrel members, the interior of the barrel member and the exterior of the rotor member being provided with rows of knives, the cutting edges of said knives extending in the longitudinal direction, coacting with each other to progressively cut the feed material to smaller and smaller pieces to obtain granules too small to harbor unwanted oversize material; and
   (c) a straining section comprising a rotor and a surrounding barrel provided with a bore, which is formed by a series of plates, one set of plates which is ridgedly attached, the other set of plates, sandwiched between said one set of plates is movable in an orbital pattern; said plates being separated from each other by shim material which measures the openings between the plates at the barrel bore to provide circumferential barrel openings to lead off the fine and fluent material from the rotor to radial barrel passages; with the oversize material, being dislodged from the opening entrances, and conveyed downstream by the rotor member to a back pressure developing outlet means.

3. An apparatus for the continuous granulating and separating of oversize material from various polymer like materials which are processed to provide feed material comprising:

(a) means for continuously supplying feed material which is warmed and under pressure to a downstream granulating section;

(b) said granulating section comprising rotor and barrel members, the interior of the barrel member and the exterior of the rotor member being provided with rows of knives, the cutting edges of said knives extending in the longitudinal direction, coacting with each other to progressively cut the feed material to smaller and smaller pieces to obtain granules too small to harbor unwanted oversize material;

(c) a straining section comprising a rotor and a surrounding barrel provided with a bore, which is formed by a series of plates, one set of plates which is ridgedly attached, the other set of plates, sandwiched between said one set of plates is movable in an orbital pattern; said plates being separated from each other by shim material which measures the openings between the plates at the barrel bore to provide circumferential barrel openings to lead off the fine and fluent material from the rotor to radial barrel passages; with the oversize material, being dislodged from the opening entrances, and conveyed downstream by the rotor member to a back pressure developing outlet means; and (d) said back pressure developing outlet means comprising a rotor and barrel type extruder, the helical rotor grooves of which can be opposite hand lead to oppose the normal flow of process material.

* * * * *